(12) United States Patent
Yeh et al.

(10) Patent No.: US 9,354,499 B2
(45) Date of Patent: May 31, 2016

(54) IMAGING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Dun-Jun Zhou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/520,956

(22) Filed: Oct. 22, 2014

(65) Prior Publication Data

US 2016/0109790 A1    Apr. 21, 2016

(30) Foreign Application Priority Data

Oct. 17, 2014   (CN) .......................... 2014 1 0550737

(51) Int. Cl.
| | | |
|---|---|---|
| *G06K 7/10* | (2006.01) | |
| *G03B 21/20* | (2006.01) | |
| *G03B 21/14* | (2006.01) | |
| *G05F 3/02* | (2006.01) | |

(52) U.S. Cl.
CPC .......... *G03B 21/2093* (2013.01); *G03B 21/145* (2013.01); *G05F 3/02* (2013.01)

(58) Field of Classification Search
CPC ....................... G06K 7/10881; G06K 7/10851
USPC ........................................ 235/379; 353/52, 20
See application file for complete search history.

(56) References Cited

U.S. PATENT DOCUMENTS

| | | | | |
|---|---|---|---|---|
| 3,180,213 A | * | 4/1965 | Parker .................... | G03B 31/06 |
| | | | | 242/328 |
| 2011/0181844 A1 | * | 7/2011 | Hashiba ................. | G03B 21/16 |
| | | | | 353/52 |

* cited by examiner

*Primary Examiner* — Karl D Frech
(74) *Attorney, Agent, or Firm* — Novak Druce Connolly Bove + Quigg LLP

(57) ABSTRACT

An imaging device includes an imaging module configured to receive an imaging assembly, which is capable of creating images; a power control module configured to receive a control circuit assembly capable of controlling the imaging assembly and a power supply capable of supplying power for the control circuit assembly and the imaging assembly; and a rotating assembly. The rotating assembly includes installation member secured to the power control module and a movable member secured to the imaging module. The movable member is movable relative to the installation member to move the imaging module relative to the power control module, so that the imaging module can be moved without moving the whole imaging device.

20 Claims, 6 Drawing Sheets

IMAGING DEVICE

FIELD

The subject matter herein generally relates to an imaging device.

BACKGROUND

An imaging device, such as a projector, generally includes an imaging module, a control module configured to control the imaging module, and a power supply configured to supply power to the imaging module and the control module. The imaging module, the power supply, and the control module are located in a housing of the imaging device.

BRIEF DESCRIPTION OF THE DRAWINGS

Implementations of the present technology will now be described, by way of example only, with reference to the attached figures.

DETAILED DESCRIPTION

Figure 1:
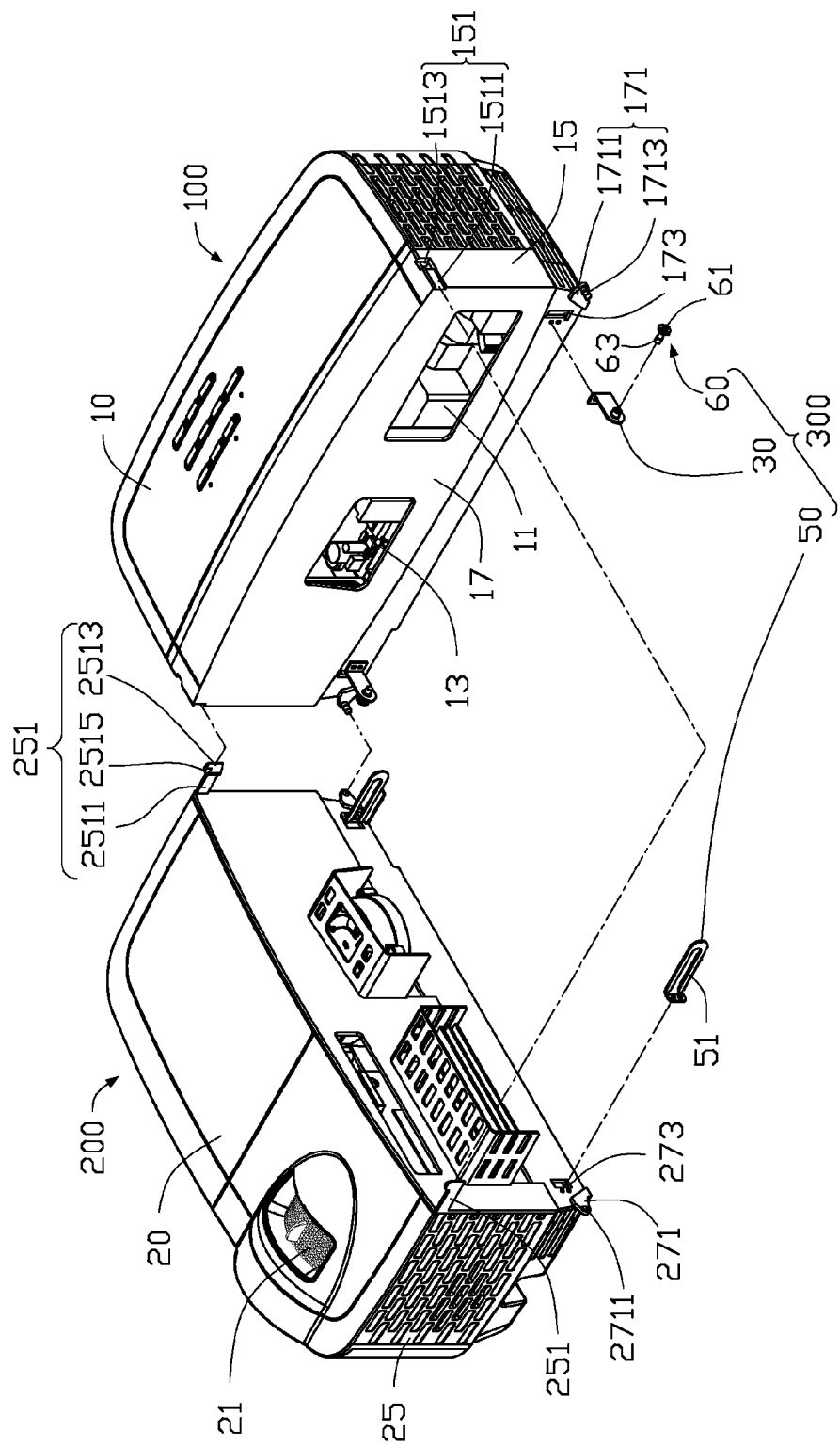
FIG. 1 is an exploded, isometric view of an embodiment of an imaging device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an imaging device in accordance with an embodiment. The imaging device includes a power control module 100 and an imaging module 200. In at least one embodiment, the imaging device 200 is a projector.

The power control module 100 includes a housing 10, a power supply 11, and a control circuit assembly 13. The power supply 11 and the control circuit assembly 13 are mounted in the housing 10. The housing 10 includes two side plates 15 and a front plate 17 coupled to the two side plates 15. In at least one embodiment, the two side plates 15 are substantially parallel to each other, and the front plate 17 is substantially perpendicular to each side plate 15. Each of a top portion and a bottom portion of each side plate 15 defines a latching slot 151. The latching slot 151 includes a receiving portion 1511 and a latching hole 1513. The latching hole 1513 extends through the side plate 15, and the receiving portion 1511 does not extend through the side plate 15. Two mounting portions 171 are secured to a bottom portion of the front plate 17. Each mounting portion 17 includes a mounting piece 1711 and a mounting post 1713 extending from the mounting piece 1711. A limiting ring 1715 (shown in FIG. 3) extending from an outer surface of the mounting post 1713. In at least one embodiment, the mounting post 1713 is substantially perpendicular to the mounting piece 1711. Each of opposite sides of the front plate 17 defines a first receiving slot 173.

The imaging module 200 includes a chassis 20 and an imaging assembly 21 mounted in the chassis 20. The imaging assembly 21 is configured to create images. The power supply 11 is configured to supply power to the control circuit assembly 13 and the imaging assembly 21, and the control circuit assembly 13 is configured to control the imaging assembly 21 to create images. In at least one embodiment, the imaging assembly 21 can be a light machine of a projector or a camera assembly. The chassis 20 includes two sidewalls 25 and a rear wall 27 coupled to the two sidewalls 25. In at least one embodiment, the two sidewalls 25 are substantially parallel to each other, and the rear wall 27 is substantially perpendicular to each sidewall 25. A latching arm 251 is secured to each of a top portion and a bottom portion of each sidewall 25. The latching arm 251 includes a resilient portion 2511 and a latching block 2513 extending from a distal end of the resilient portion 2511. A latching piece 2515 extends from each of a top edge and a bottom edge of the resilient portion 2511. Two locking pieces 271 are secured to a bottom portion of the rear wall 27. Each latching piece 271 defines a mounting hole 2711. Each of opposite sides of the rear wall 27 defines a second receiving slot 273.

The imaging device further includes a rotating assembly 300. The rotating assembly 300 includes an installation member 30, a movable member 50, and a locking member 60. The installation member 30 can be engaged in the first receiving slot 173 and defines an installation hole 31. The movable member 50 can be engaged in the second receiving slot 273 and defines a sliding slot 51. The locking member 60 includes a head portion 61 and a neck portion 63.

Figure 2:
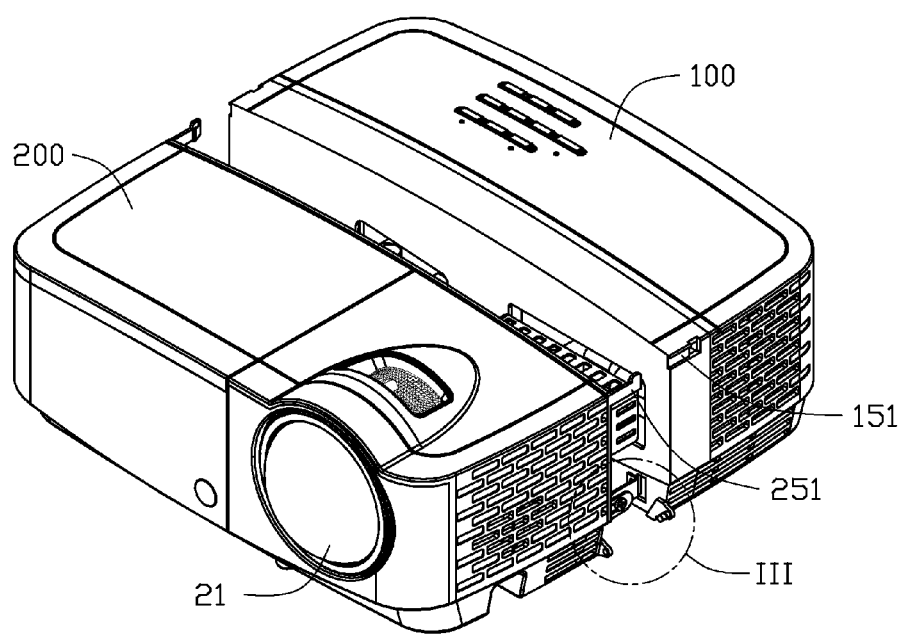
FIG. 2 is an assembled, isometric view of the imaging device of FIG. 1, showing an imaging module in a movable position relative to a power control module.
Figure 3:
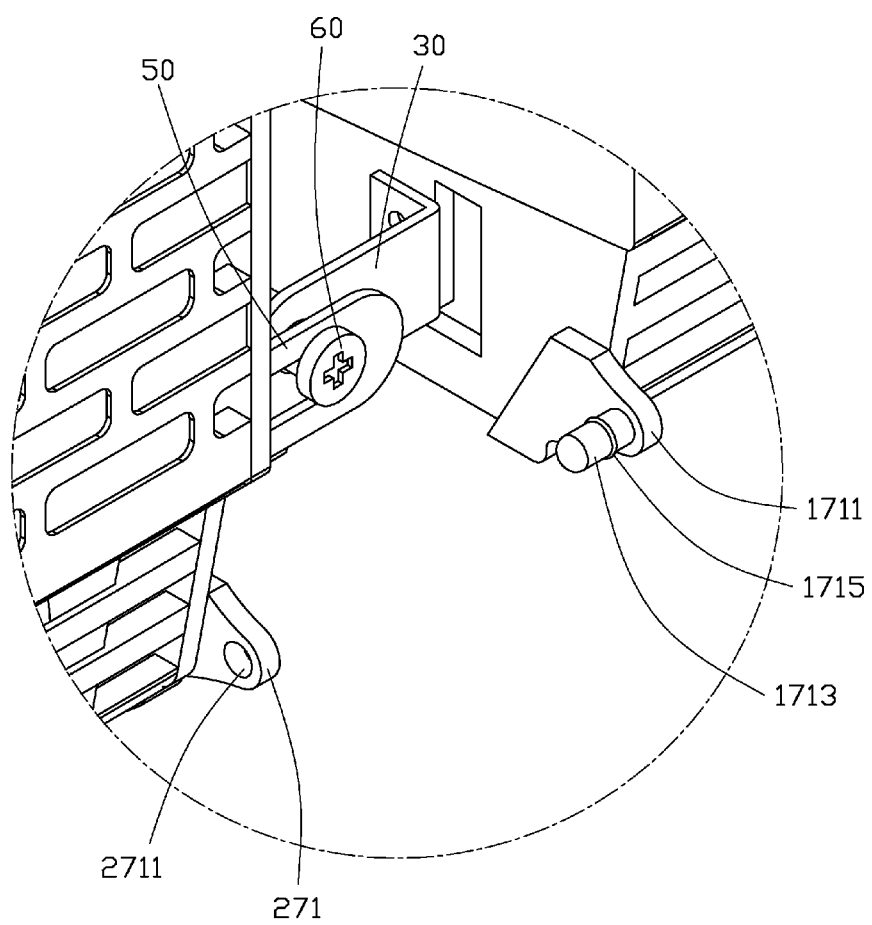
FIG. 3 is an enlarge view of a circled portion III of the imaging device of FIG. 2.
Figure 4:
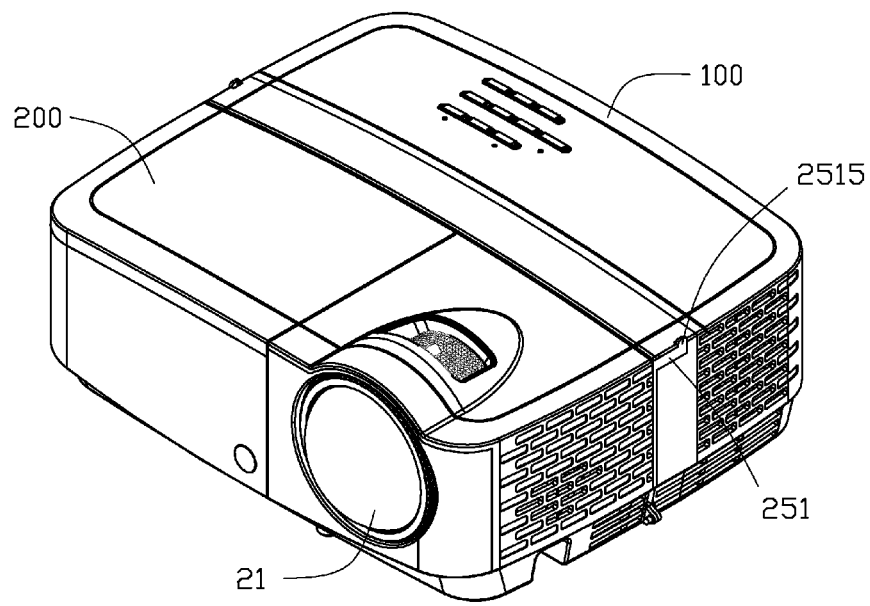
FIG. 4 is similar to FIG. 2, but showing the imaging module in a fixing position relative to the power control module.

Referring to FIGS. 2-4, in assembly, the installation member 30 is secured to the front plate 17 and located in a side of the first receiving slot 173. The movable member 50 is secured to the rear wall 27 and located in a side of the second receiving slot 273. The neck portion 63 is locked in the installation hole 31 extending through the sliding slot 51. The imaging module 200 is moved to align the movable member 50 to the first receiving slot 173, align the installation member 30 to the second receiving slot 273, align the mounting post 1713 to the mounting hole 2711, and align the latching arm 251 to the latching slot 151. The imaging module 200 is moved horizontally until the movable member 50 is moved be received in the housing 10 through the first receiving slot 173, and the installation member 30 is moved be received in the chassis 20 through the second receiving slot 273. The mounting post 1713 is engaged in the mounting hole 2711. The latching arm 251 is latched in the latching slot 151, the resilient portion 2511 is received in the receiving portion 1511, the latching block 2513 is engaged in the latching hole 1513, the latching piece 2513 abuts to an edge of the latching hole 1513, and the edge is substantially perpendicular to the side plate 15. The locking piece 271 is located between the mounting piece 1711 and the limiting ring 1715. In this position, the imaging module 200 is located in a fixing position.

When the imaging module 200 is needed to be adjusted, the latching arm 251 is pulled outwards to disengage the latching block 2513 from the latching hole 1513, and the mounting piece 271 is also pulled to disengage from the limiting ring 1715. The imaging module 200 is moved horizontally unit the neck portion 63 is latched by an edge of the sliding slot 51, the movable member 50 is slid out of the first receiving slot 173, and the installation member 30 is slid out of the second receiving slot 273. In this position, the imaging module 200 is located in a movable position.

Figure 5:
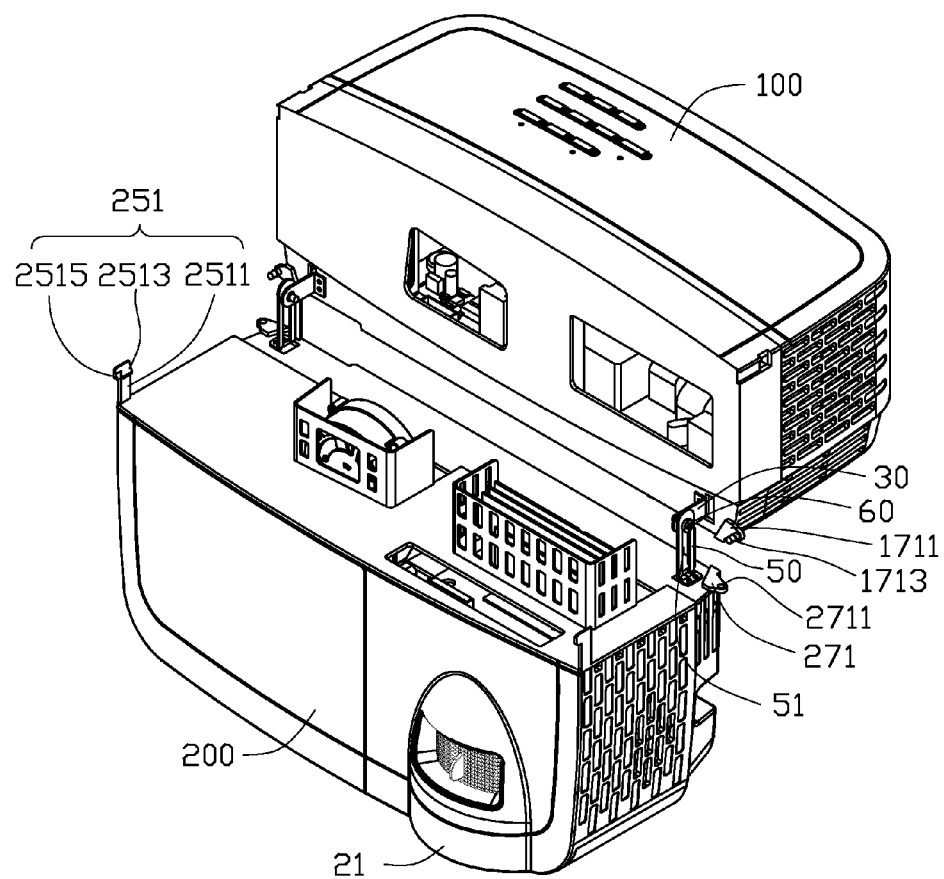
FIG. 5 is a similar to FIG. 2, but showing the imaging module in a different rotating position.
Figure 6:
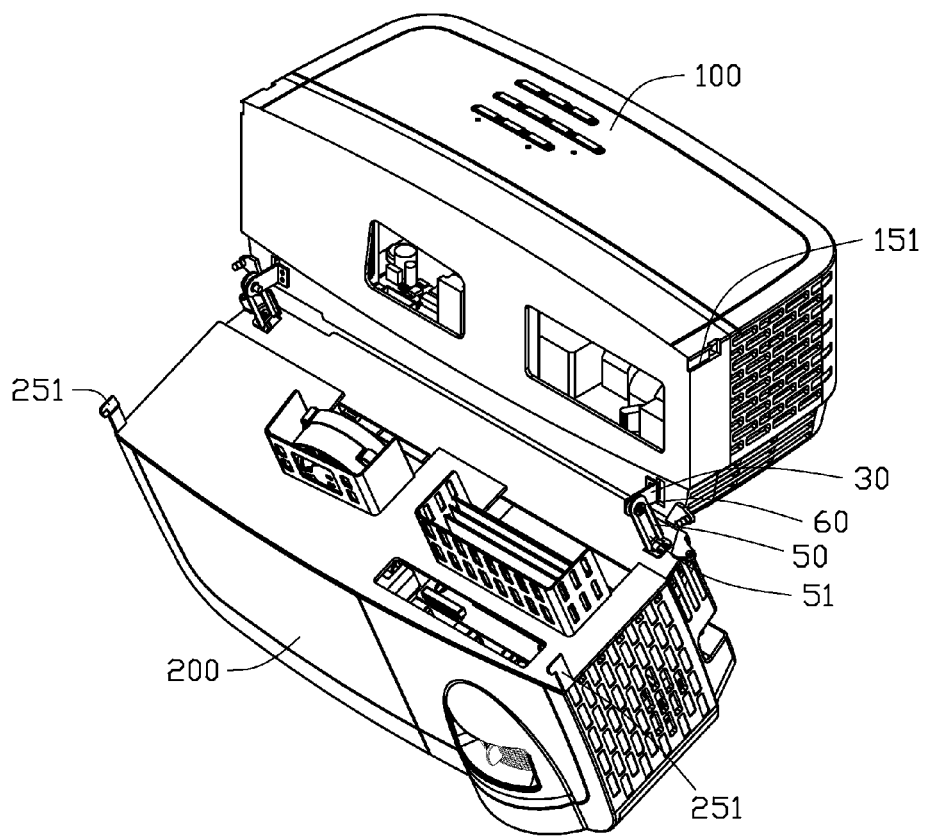
FIG. 6 is similar to FIG. 5, but showing the imaging module in another different rotating position.

FIG. 5 and FIG. 6 illustrate that when the imaging module 200 is in the movable position, the imaging module 200 can be rotated relative to the power control module 100 through the movable member 50 rotating about the locking member 60. The imaging module 200 can be rotated 90 degrees (shown in FIG. 5) or more than 90 degrees (shown in FIG. 6). When the installation member 30 is secured to a bottom edge of the front plate 17, and the movable member 50 is secured to a bottom edge of the rear wall 27, the imaging module 200 can be rotated to below the power control module 100 in 180 degrees.

The embodiments shown and described above are only examples. Many details are often found in the art such as the other features of an imaging device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An imaging device comprising:
    an imaging module configured to receive an imaging assembly which is capable of creating images;
    a power control module configured to receive:
        a control circuit assembly capable of controlling the imaging assembly, and
        a power supply capable of supplying power to the control circuit assembly and the imaging assembly; and
    a rotating assembly comprising an installation member secured to the power control module and a movable member secured to the imaging module;
    wherein the movable member is movably mounted to the installation member and movable relative to the installation member to move the imaging module relative to the power control module.

2. The imaging device of claim 1, wherein the imaging module is slidable relative to the power control module between a fixing position and a movable position, when the imaging module is in the fixing position, the imaging module is fixed to the power control module, and when the imaging module is in the movable position, the imaging module is rotatable relative to the power control module.

3. The imaging device of claim 2, wherein the power control module defines a first receiving slot, and the imaging module defines a second receiving slot; when the imaging module is in the fixing position, the movable member is engaged in the first receiving slot, and the installation member is engaged in the second receiving slot; and when the imaging module is in the movable position, the movable member is disengaged from the first receiving slot, and the installation member is disengaged from the second receiving slot.

4. The imaging device of claim 2, wherein the rotating assembly further comprises a locking member, the locking member comprises a head portion and a neck portion, the installation member defines an installation hole, the movable member defines a sliding slot, the neck portion is locked in the installation hole through the sliding slot, and the head portion is located out of the sliding slot.

5. The imaging device of claim 4, wherein when the imaging module is slid relative to the power control module, the neck portion is slid in the sliding slot, and when the imaging module is rotated relative to the power control module, the movable member is rotated about the neck portion.

6. The imaging device of claim 2, wherein the power control module further comprises a mounting portion, and the mounting portion comprises a mounting post; the imaging module further comprises a locking piece with a mounting hole, and when the imaging module is in the fixing position, the mounting post is engaged in the mounting hole.

7. The imaging device of claim 6, wherein the mounting portion further comprises a limiting ring extending from an outer surface of the mounting post, the mounting portion further comprises a mounting piece, the mounting post extends from the mounting piece, and the locking piece is located between the limiting ring and the mounting piece.

8. The imaging device of claim 7, wherein the mounting post is substantially perpendicular to the mounting piece.

9. The imaging device of claim 2, wherein the power control module further defines a latching slot, the imaging module further comprises a latching arm, and when the imaging module is in the fixing position, the latching arm is engaged in the latching slot.

10. The imaging device of claim 9, wherein the latching slot has a receiving portion and a latching hole, the latching arm comprises a resilient portion and a latching block extending from the resilient portion, the resilient portion is received in the receiving portion, and the latching block is engaged in the latching hole.

11. An imaging device comprising:
    an imaging module configured to receive an imaging assembly, which is capable of creating images;
    a power control module configured to receive a control circuit assembly capable of controlling the imaging assembly and a power supply capable of supplying power for the control circuit assembly and the imaging assembly; and
    a rotating assembly comprising an installation member secured to the power control module and a movable member secured to the imaging module;
    wherein the movable member is slidable relative to the installation member to slide the imaging module relative to the power control module between a fixing position and a movable position, when the imaging module is in the fixing position, the imaging module is fixed to the power control module, and when the imaging module is in the movable position, the movable member is rotatable relative to the installation member to rotate the imaging module relative to the power control module.

12. The imaging device of claim 11, wherein the power control module defines a first receiving slot, and the imaging module defines a second receiving slot; when the imaging module is in the fixing position, the movable member is engaged in the first receiving slot, and the installation member is engaged in the second receiving slot; and when the imaging module is in the movable position, the movable member is disengaged from the first receiving slot, and the installation member is disengaged from the second receiving slot.

13. The imaging device of claim 12, wherein the power control module comprises a housing, the housing has a front plate, and the first receiving slot is defined in the housing; the imaging module comprises a chassis, the chassis has a rear wall facing the front plate, and the second receiving slot is defined in the rear wall; when the imaging module is in the fixing position, the movable member extends into the housing, and the installation member extends into the chassis.

14. The imaging device of claim 11, wherein the rotating assembly further comprises a locking member, the locking member comprises a head portion and a neck portion, the installation member defines an installation hole, the movable member defines a sliding slot, the neck portion is locked in the installation hole through the sliding slot, and the head portion is located out of the sliding slot.

15. The imaging device of claim 14, wherein when the imaging module is slid relative to the power control module, the neck portion is slid in the sliding slot, and when the imaging module is rotated relative to the power control module, the movable member is rotated about the neck portion.

16. The imaging device of claim 11, wherein the power control module further comprises a mounting portion, and the mounting portion comprises a mounting post; the imaging module further comprises a locking piece with a mounting hole, and when the imaging module is in the fixing position, the mounting post is engaged in the mounting hole.

17. The imaging device of claim 16, wherein the mounting portion further comprises a limiting ring extending from an outer surface of the mounting post, the mounting portion further comprises a mounting piece, the mounting post extends from the mounting piece, and the locking piece is located between the limiting ring and the mounting piece.

18. The imaging device of claim 17, wherein the mounting post is substantially perpendicular to the mounting piece.

19. The imaging device of claim 11, wherein the power control module further defines a latching slot, the imaging module further comprises a latching arm, and when the imaging module is in the fixing position, the latching arm is engaged in the latching slot.

20. The imaging device of claim 19, wherein the latching slot has a receiving portion and a latching hole, the latching arm comprises a resilient portion and a latching block extending from the resilient portion, the resilient portion is received in the receiving portion, and the latching block is engaged in the latching hole.

* * * * *